(12) United States Patent
Chapman et al.

(10) Patent No.: US 8,210,348 B1
(45) Date of Patent: Jul. 3, 2012

(54) STORAGE DEVICE FOR WRAPPING PAPER AND ASSOCIATED SUPPLIES

(76) Inventors: Amanda Chapman, Huntingtown, MD (US); John O. Chapman, Huntingtown, MD (US)

( * ) Notice: Subject to any disclaimer, the term of this patent is extended or adjusted under 35 U.S.C. 154(b) by 225 days.

(21) Appl. No.: 12/797,554

(22) Filed: Jun. 9, 2010

(51) Int. Cl.
*B65D 85/00* (2006.01)
(52) U.S. Cl. .......................... 206/391; 206/575
(58) Field of Classification Search .............. 206/391, 206/575, 225, 216, 223, 389, 372, 373, 212; 312/249.11, 249.8
See application file for complete search history.

(56) References Cited

U.S. PATENT DOCUMENTS

| | | | |
|---|---|---|---|
| 4,012,051 A * | 3/1977 | Embinder | 280/47.19 |
| 4,369,929 A | 1/1983 | Cayer | |
| 5,071,147 A * | 12/1991 | Stansbury | 280/47.19 |
| D331,334 S | 12/1992 | Hollington | |
| D427,431 S * | 7/2000 | Jensen | D3/255 |
| 6,123,197 A | 9/2000 | Marquez et al. | |
| D439,737 S * | 4/2001 | Bonny et al. | D3/255 |
| 6,266,942 B1 * | 7/2001 | McClorey | 53/390 |
| 6,698,589 B1 | 3/2004 | Johnson | |
| 6,848,576 B1 | 2/2005 | Jaron et al. | |
| 7,134,583 B2 * | 11/2006 | May et al. | 225/97 |
| 7,222,733 B2 * | 5/2007 | Kim | 206/315.3 |
| 7,278,537 B2 | 10/2007 | Lown et al. | |
| D579,692 S | 11/2008 | Canupp | |
| 7,584,854 B2 * | 9/2009 | Chandaria | 206/736 |
| 2001/0040111 A1 | 11/2001 | Spradlin et al. | |
| 2005/0127083 A1 * | 6/2005 | Russell | 221/30 |
| 2006/0016153 A1 * | 1/2006 | King | 53/390 |
| 2008/0245699 A1 * | 10/2008 | Salazar | 206/575 |
| 2011/0174678 A1 * | 7/2011 | Champlin | 206/575 |

OTHER PUBLICATIONS

WWW.IMPROVEMENTSCATALOG.COM; Gift Wrap Storage; Internet; as of Jun. 9, 2010.
WWW.IMPROVEMENTSCATALOG.COM; Gift Wrap'n Craft Box; Internet; as of Jun. 9, 2010.

* cited by examiner

*Primary Examiner* — J. Gregory Pickett
*Assistant Examiner* — Ernesto Grano

(57) ABSTRACT

A storage device for storing and organizing wrapping paper and wrapping supplies featuring a main housing having an inner cavity and a top panel functioning as a lid, the top panel can move between an open position and a closed position respectively allowing and preventing access to the inner cavity; and a first set of tubes, a second set of tubes, and a third set of tubes, each tube extending through the inner cavity of the housing from the bottom panel upwardly toward the top panel, each tubes is adapted to receive a roll of wrapping paper, wherein the first set of tubes has a height greater than a height of the second set of tubes, and the height of the second set of tubes is greater than a height of the third set of tubes.

16 Claims, 5 Drawing Sheets

STORAGE DEVICE FOR WRAPPING PAPER AND ASSOCIATED SUPPLIES

FIELD OF THE INVENTION

The present invention is directed to a storage device, more particularly to a storage device designed to store and organize wrapping paper and wrapping supplies.

BACKGROUND OF THE INVENTION

Wrapping paper and supplies are generally stored freely in closets, in bags, in boxes, or in general containers. The paper and supplies often become strewn, tangled, lost, and damaged when stored this way. The present invention features a storage device for storing and organizing wrapping paper and other supplies such as scissors, greeting cards, ribbon, tape, labels, and the like. The device of the present invention helps organize the wrapping paper and supplies and helps prevent wrapping paper and other supplies from becoming lost and/or damaged.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
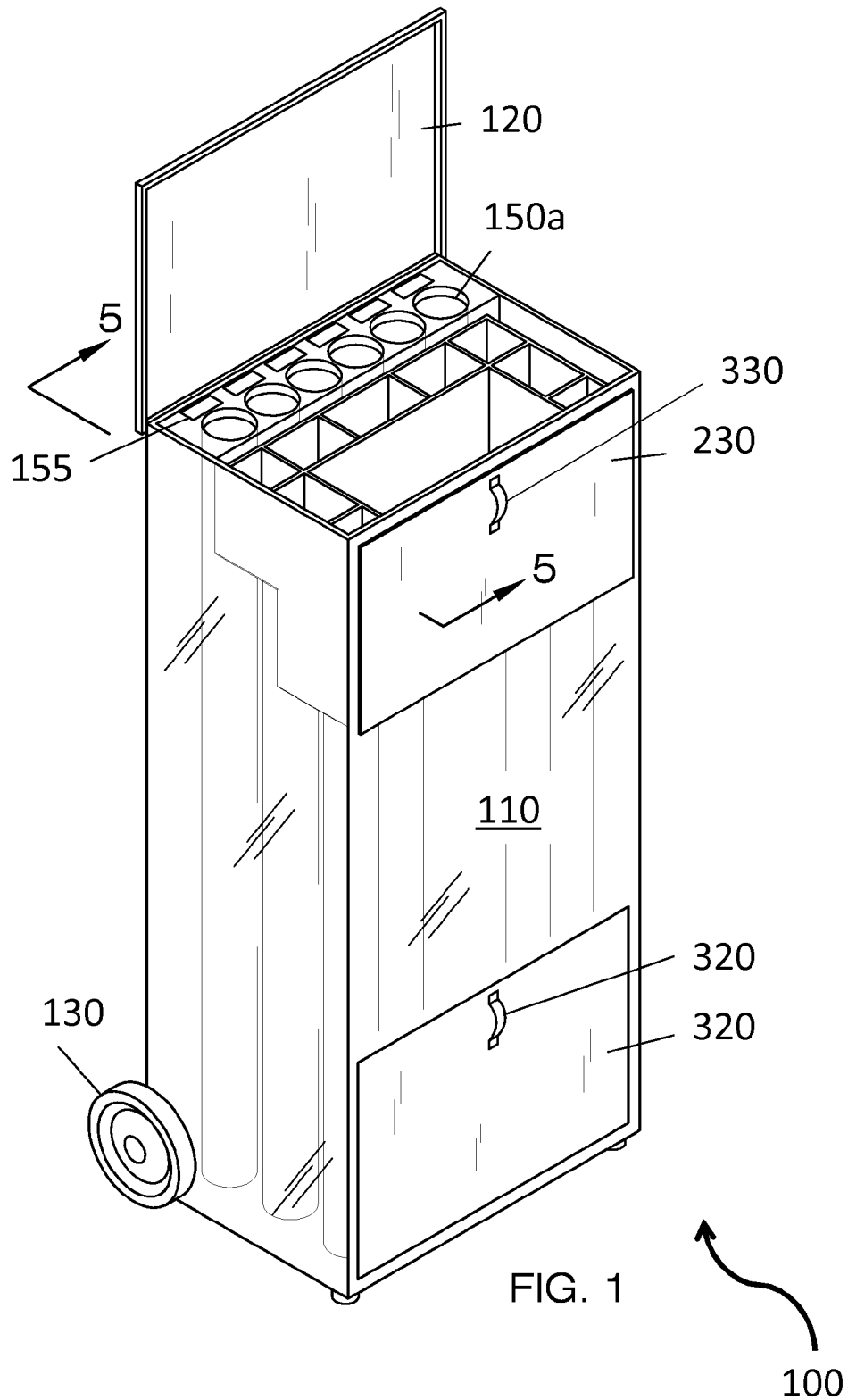
FIG. 1 is a perspective view of the storage device of the present invention.

Referring now to FIGS. 1-5, the present invention features a storage device 100 for storing and organizing wrapping paper and other supplies such as scissors, greeting cards, ribbon, tape, labels, and the like. The device 100 of the present invention helps organize the wrapping paper and supplies and helps prevent wrapping paper and other supplies from becoming lost and/or damaged. For example, the device 100 allows a user to organize several different sizes of wrapping paper (e.g., 3 foot rolls, 2.5 foot rolls, 2 foot rolls, etc.).

The storage device 100 of the present invention comprises a main housing 110 having a front surface, a back surface, a first side panel, a second side panel, a bottom panel, a top panel 120, and an inner cavity. The top panel 120 may be pivotally attached via a hinge 126. The top panel 120 functions as a lid, which can move between multiple positions including but not limited to an open position and a closed position respectively allowing and preventing access to the inner cavity of the housing 110. Disposed on the bottom panel of the housing 110 are one or more wheels 130 for providing a means of easily transporting the device 100 from one place to another.

Figure 2:
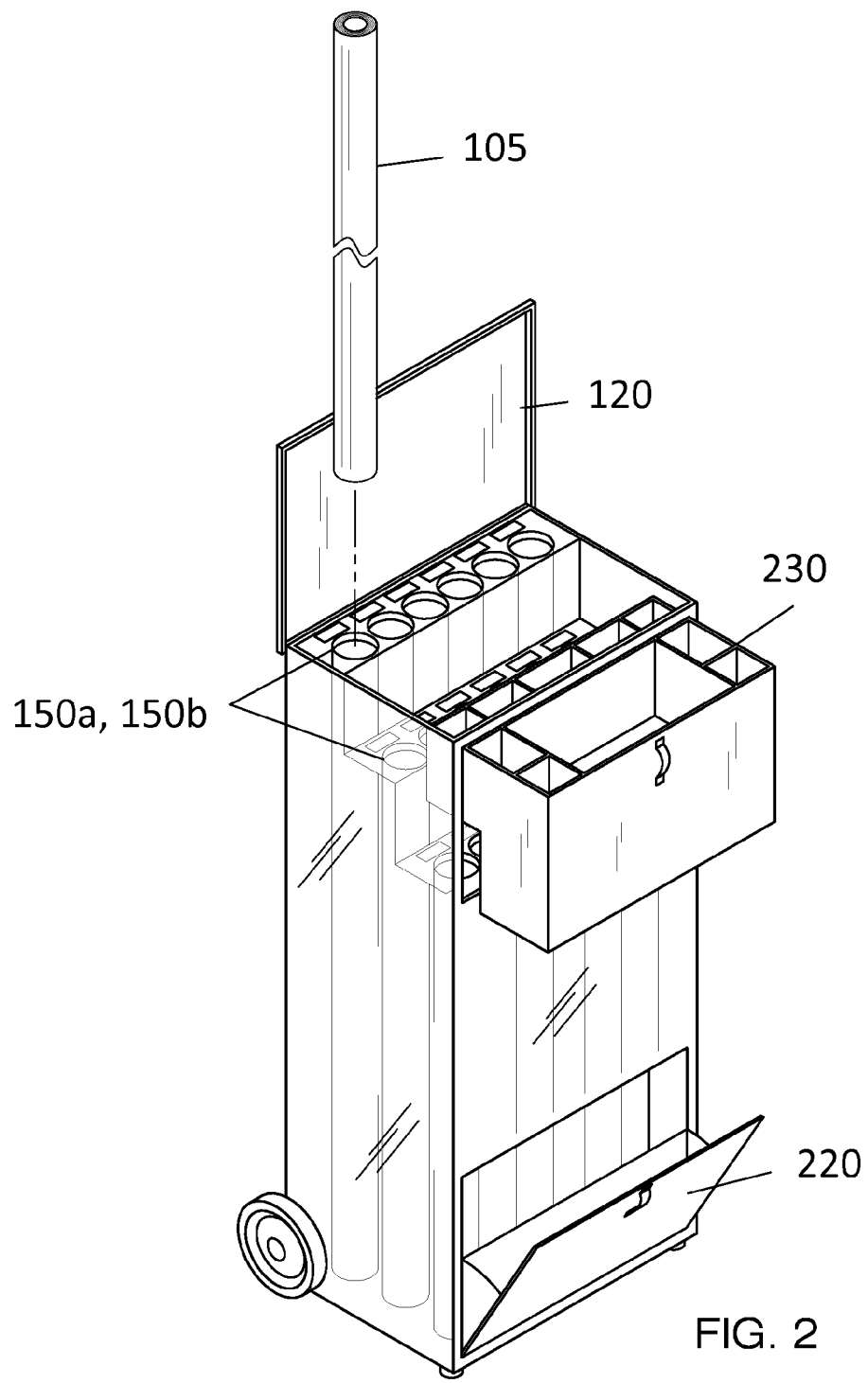
FIG. 2 is an exploded view of the storage device of FIG. 1.
Figure 3:
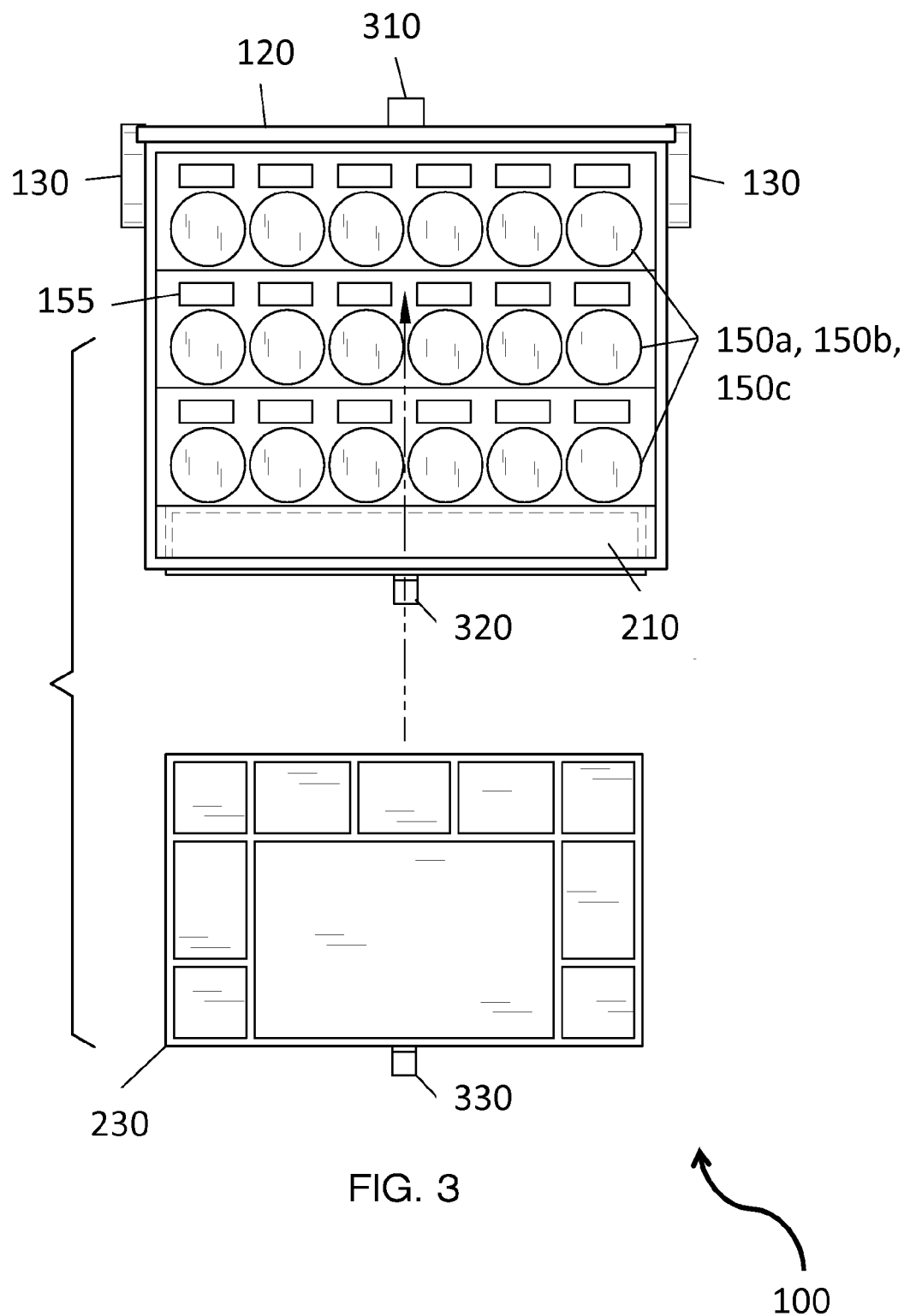
FIG. 3 is a top view of the storage device of FIG. 1.
Figure 4:
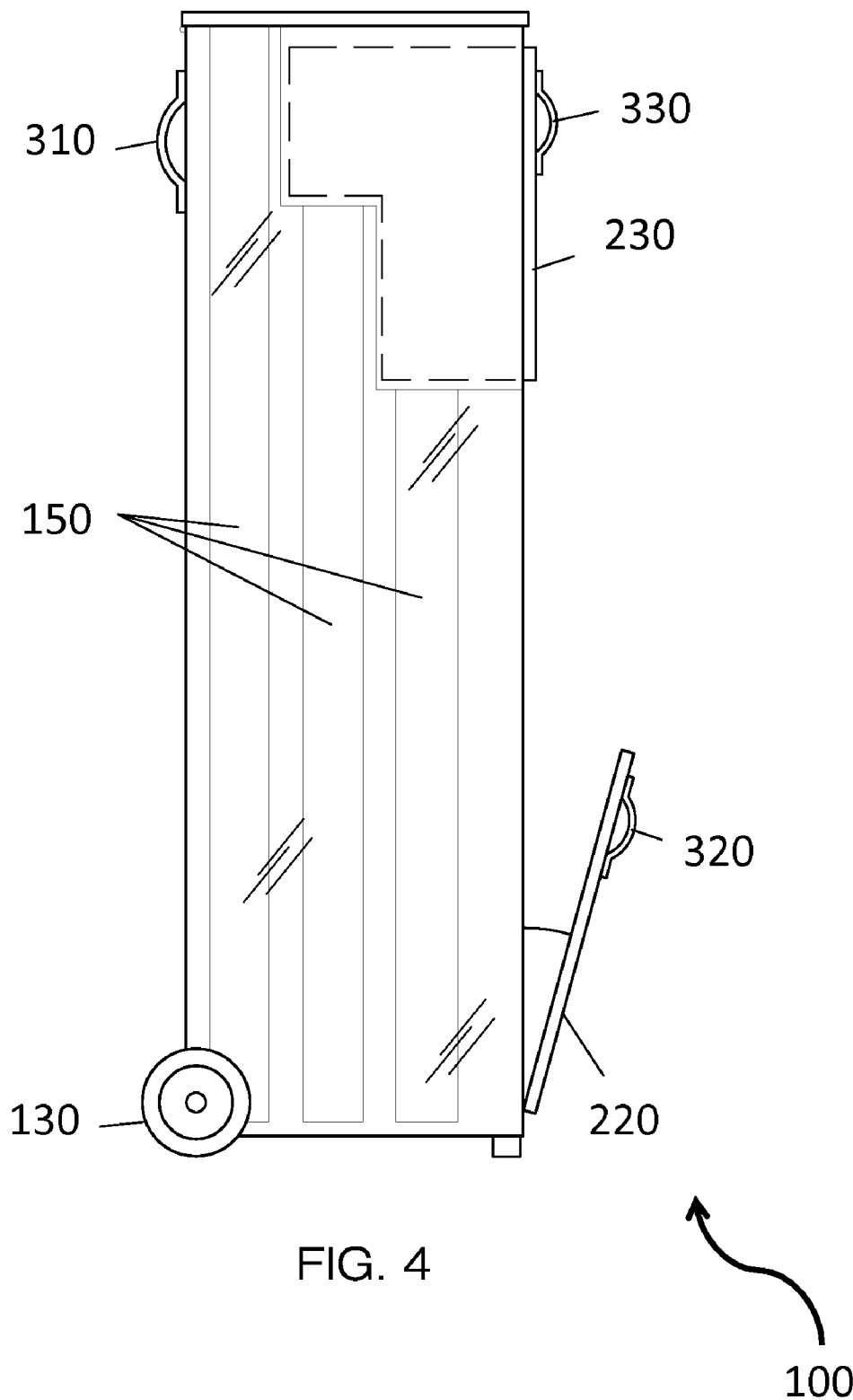
FIG. 4 is a side view of the storage device of FIG. 1.
Figure 5:
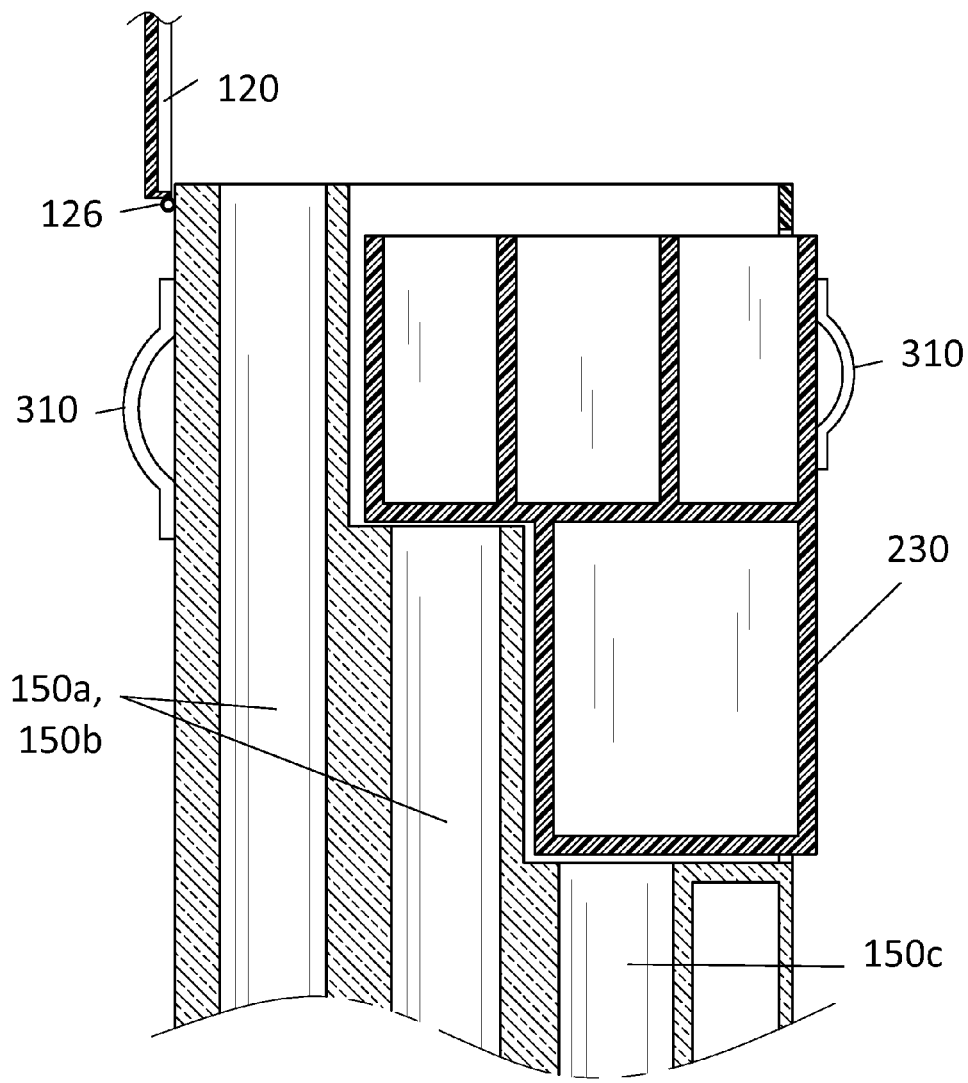
FIG. 5 is a side cross sectional view of the storage device of FIG. 1.

Extending through the inner cavity of the housing 110 (e.g., from the bottom panel upwardly toward the top panel 120) is a plurality of tubes 150. The tubes 150 are adapted to receive rolls of wrapping paper 105. As shown in FIG. 1, FIG. 2, and FIG. 3, a first set of tubes 150a (e.g., six tubes) may be arranged near the back panel of the housing 110, a second set of tubes 150b (e.g., six tubes) may be arranged in front of the first set of tubes 150a, and a third set of tubes 150c (e.g., six tubes) may be arranged in front of the second set of tubes 150b. The sets of tubes 150 may be constructed in a variety of sizes so as to accommodate various sizes of rolls of wrapping paper 105. For example, the first set of tubes 150a may have a greater height than that of the second set of tubes 150b, which has a greater height than that of the third set of tubes 150c. In some embodiments, each set of tubes 150 has the same diameter (e.g., about 7 inches). In some embodiments, the first set of tubes 150a is about 35 inches in length, the second set of tubes 150b is about 29 inches in length, and the third set of tubes 105c is about 23 inches in length. The present invention is not limited to the aforementioned dimensions.

A top compartment 230 is disposed in the housing 110 near the top panel 120. The top compartment 230 may function like a drawer, e.g., the top compartment 230 can be slid in and out of the housing 110 (see FIG. 2). Generally, the top compartment 230 is sectioned and functions to hold various items including but not limited to scissors, tape, name tags, ribbons, the like, or a combination thereof. As shown in FIG. 1, the top compartment 230 has an open top and a plurality of dividers, sectioning the top compartment 230. A third handle 330 may be attached to the top compartment 230, which helps to pull the top compartment 230 out like a drawer. In some embodiments, the top compartment 230 covers a portion of the sets of tubes 150, and the tubes 150 are exposed when the top compartment 230 is slid out of the housing 110 (see FIG. 2).

In some embodiments, a bottom compartment 210 is disposed in the housing 110 at the bottom panel. The bottom compartment 210 may be used for a variety of reasons, for example for storing flat sheets of wrapping paper, tissue paper, greeting cards, etc. The bottom compartment 210 may comprise a bottom door 220 that can pivot between an open position and a closed position.

In some embodiments, a first handle 310 is disposed on the back surface of the housing 110. A second handle 320 may be disposed on the bottom door 220 in the front surface of the housing 110. A third handle 330 may be disposed on the top compartment 230.

As used herein, the term "about" refers to plus or minus 10% of the referenced number. For example, an embodiment wherein a set of tubes 150 has a diameter of about 7 inches includes a set of tubes 150 having a diameter between 6.3 and 7.7 inches.

The disclosures of the following U.S. Patents are incorporated in their entirety by reference herein: U.S. Pat. No. 4,369,929; U.S. Pat. No. 6,123,197; U.S. Pat. No. 6,698,589; U.S. Pat. No. 6,848,576; U.S. Pat. No. 7,278,537; U.S. Pat. Application No. 2001/0040111.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A storage device for storing and organizing wrapping paper and wrapping supplies, said storage device comprising:
   (a) a main housing having an inner cavity, a first side panel, a second side panel, a front panel, a bottom panel, and a top panel functioning as a lid, the top panel can move between multiple positions including an open position and a closed position respectively allowing and preventing access to the inner cavity;
   (b) a first set of tubes, a second set of tubes, and a third set of tubes, each tube extending through the inner cavity of the housing from the bottom panel upwardly toward the top panel, each tubes is adapted to receive a roll of wrapping paper, wherein the first set of tubes has a height greater than a height of the second set of tubes, and the height of the second set of tubes is greater than a height of the third set of tubes; and
   (c) a stepped top compartment disposed in the housing, the stepped top compartment can slide in and out of the housing like a drawer, wherein a plurality of dividers is disposed in the stepped top compartment; and wherein the stepped top compartment covers a portion of the second and third sets of tubes, and the sets of tubes are exposed when the stepped top compartment is slid out of the housing.

2. The storage device of claim 1, wherein the top panel is pivotally attached to the housing via a hinge.

3. The storage device of claim 1 further comprising one or more wheels disposed on the bottom panel of the housing.

4. The storage device of claim 1, wherein the first set of tubes comprises six tubes.

5. The storage device of claim 1, wherein the second set of tubes comprises six tubes.

6. The storage device of claim 1, wherein the third set of tubes comprises six tubes.

7. The storage device of claim 1, wherein the first set of tubes is positioned near the back panel of the housing, the second set of tubes is positioned in front of the first set of tubes, and the third set of tubes is positioned in front of the second set of tubes.

8. The storage device of claim 1, wherein each tube of each set of tubes has a diameter of about 7 inches.

9. The storage device of claim 1, wherein each tube of the first set of tubes is about 35 inches in length.

10. The storage device of claim 1, wherein each tube of the second set of tubes is about 29 inches in length.

11. The storage device of claim 1, wherein each tube of the third set of tubes is about 23 inches in length.

12. The storage device of claim 1 further comprising a first handle disposed on a back surface of the housing.

13. The storage device of claim 1 further comprising a third handle disposed on the stepped top compartment.

14. The storage device of claim 1 further comprising a bottom compartment disposed in the housing at the bottom panel.

15. The storage device of claim 14, wherein the bottom compartment comprises a bottom door that can pivot between an open position and a closed position.

16. The storage device of claim 15 further comprising a second handle disposed on the bottom door.

* * * * *